US005952562A

United States Patent [19]
Yagi et al.

[11] Patent Number: 5,952,562
[45] Date of Patent: Sep. 14, 1999

[54] SCANNING PROBE MICROSCOPE INCORPORATING AN OPTICAL MICROSCOPE

[75] Inventors: Akira Yagi, Sagamihara; Hiroyuki Nishida, Hachioji, both of Japan

[73] Assignee: Olympus Optical Co., Ltd., Tokyo, Japan

[21] Appl. No.: 08/752,390

[22] Filed: Nov. 20, 1996

[30] Foreign Application Priority Data

Nov. 22, 1995 [JP] Japan ..................................... 7-304209
Jul. 3, 1996 [JP] Japan ..................................... 8-173339

[51] Int. Cl.[6] .................................................. G01B 11/30
[52] U.S. Cl. ............................................. 73/105; 250/306
[58] Field of Search .............................. 73/105; 250/306, 250/307

[56] References Cited

U.S. PATENT DOCUMENTS

| | | | |
|---|---|---|---|
| 3,846,009 | 11/1974 | Courtney-Pratt et al. | 359/375 |
| 4,724,318 | 2/1988 | Binnig | 250/306 |
| 4,914,293 | 4/1990 | Hayashi et al. | 250/306 |
| 5,274,434 | 12/1993 | Morioka et al. | 350/237.4 |
| 5,345,333 | 9/1994 | Greenberg | 359/389 |
| 5,539,197 | 7/1996 | Courjon et al. | 250/306 X |
| 5,650,614 | 7/1997 | Yasutake et al. | 250/306 X |
| 5,672,816 | 9/1997 | Park et al. | 73/105 X |
| 5,675,145 | 10/1997 | Toda et al. | 250/306 X |

FOREIGN PATENT DOCUMENTS

| | | |
|---|---|---|
| 2-16403 | 1/1990 | Japan . |
| WO 89/01603 | 2/1989 | WIPO . |

OTHER PUBLICATIONS

R. Hoffman et al; "Modulation Contrast Microscope"; May 1975; pp. 1169–1176; Applied Optics, vol. 14, No. 5.

*Primary Examiner*—Thomas P. Noland
*Attorney, Agent, or Firm*—Frishauf, Holtz, Goodman, Langer & Chick

[57] ABSTRACT

A scanning probe microscope includes a cantilever having a probe on its free end, a displacement measuring unit for measuring a displacement of the cantilever caused by an interaction between a specimen and the probe, and a tube actuator for supporting the cantilever and the displacement measuring unit and controlling the position of the probe in a three-dimensional manner, the actuator and the probe being arranged coaxial with each other. The apparatus also includes a special microscopic optical system including a pupil modulating element and an oblique illumination optical system for obliquely illuminating the specimen, which together constitute an optical microscope capable of high-power observation of optically transparent specimens.

41 Claims, 7 Drawing Sheets

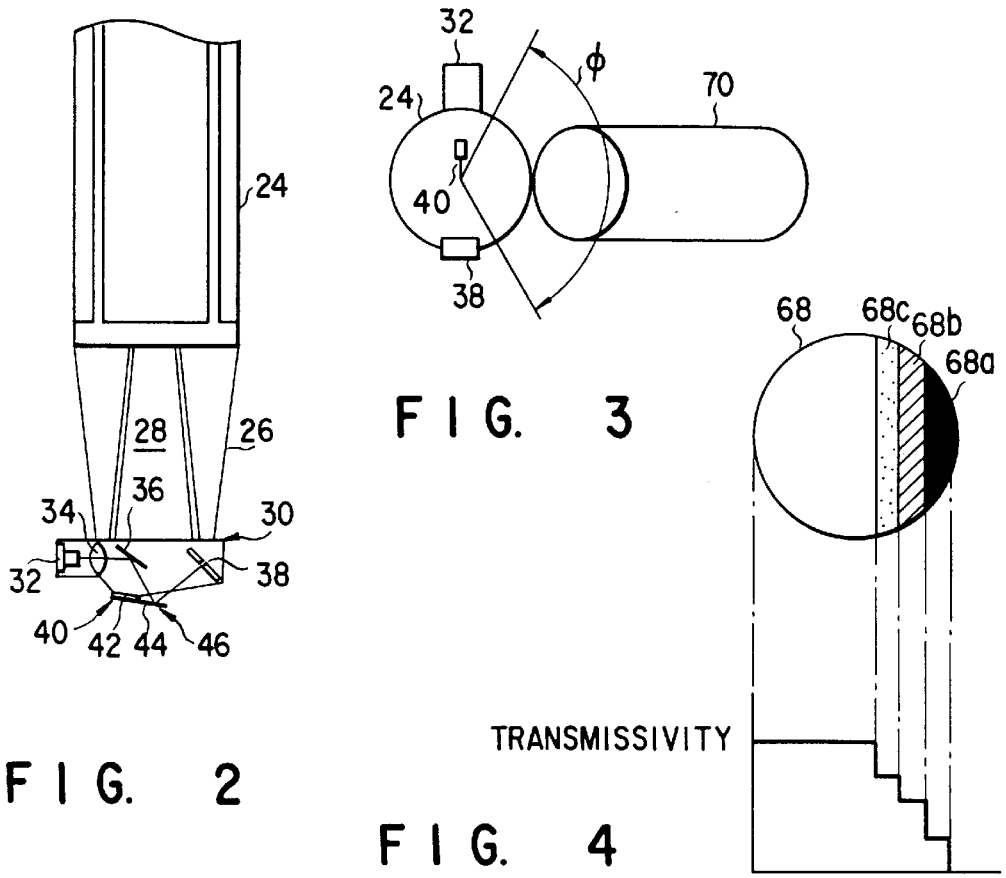
FIG. 2
FIG. 3
FIG. 4
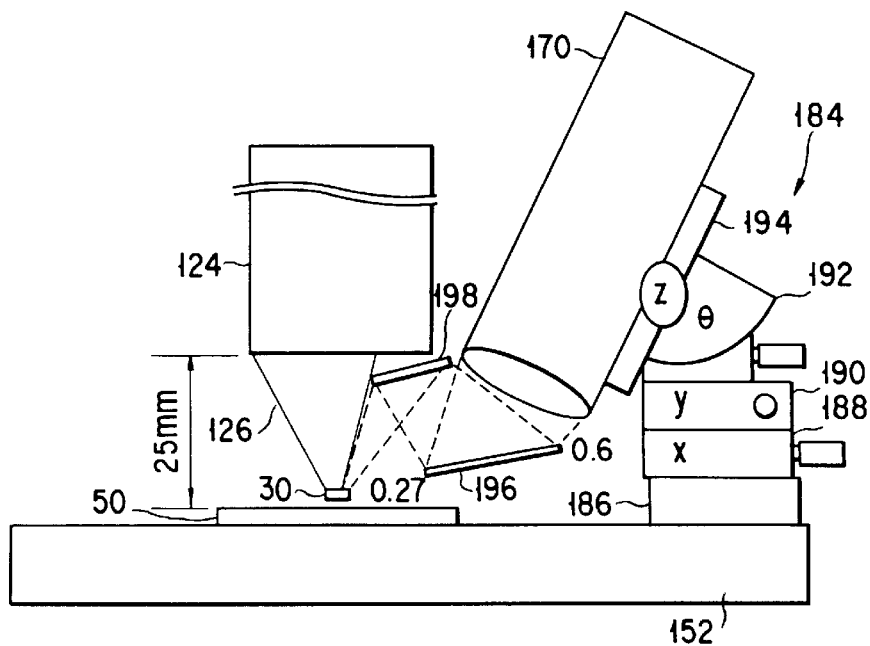
FIG. 5

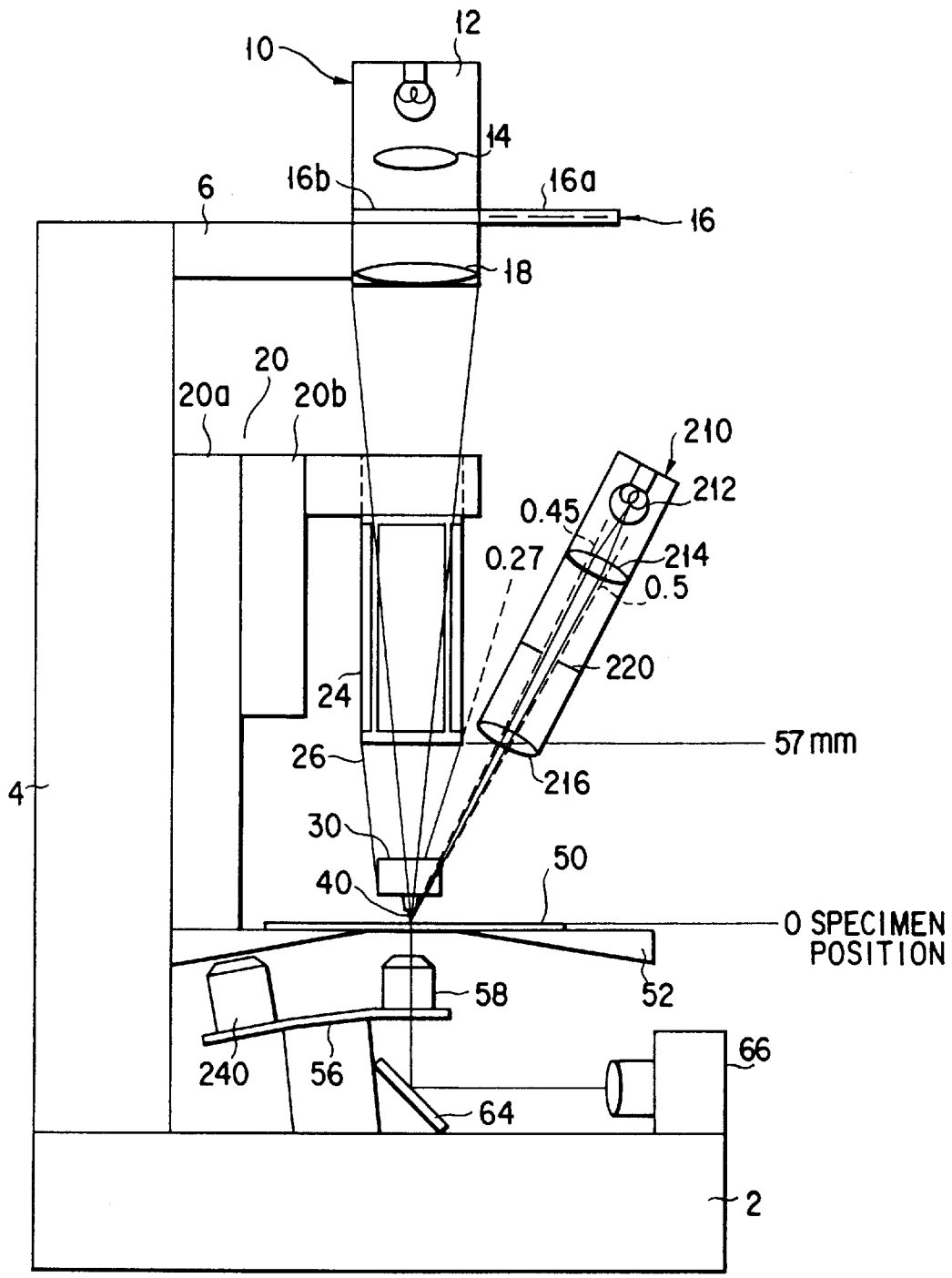
F I G. 6

SCANNING PROBE MICROSCOPE INCORPORATING AN OPTICAL MICROSCOPE

BACKGROUND OF THE INVENTION

1. Field of the Invention

The present invention relates to a scanning probe microscope incorporating an optical microscope, and more particularly, to a scanning probe microscope with an optical microscope capable of providing visible images of optically transparent specimens.

2. Description of the Related Art

A scanning probe microscope is an apparatus for measuring configurations and the like of a specimen with resolutions on the order of sub-nanometers on the basis of an interaction between the specimen and a probe. An example of an atomic force microscope is described in U.S. Pat. No. 4,724,318. The atomic force microscope is a typical scanning probe microscope, which measures a force acting between the probe supported on an elastic body and the specimen as a displacement of the elastic body, and determines the configurations of the specimen on the basis of this displacement.

Generally, in a scanning probe microscope, horizontal scanning and vertical position control are carried out by using a tube actuator or so-called tube scanner.

Also known is a scanning probe microscope that incorporates an optical microscope for positioning between the specimen and the probe. The optical microscope, which can provide an image that serves as a control, is very useful to the evaluation of scanning probe microscope (SPM) measurement results, as well as to the positioning of the scanning probe microscope. In general, an optical microscope, such as the one described in International Publication No. WO 89/01603, is incorporated in a manner such that its optical axis is in line with the probe axis.

Objects to be observed by means of conventional scanning probe microscopes were formerly limited to opaque substances, such as metals, semiconductors, etc. Recently, however, there has been an increasing demand for observations of biological specimens using these microscopes.

Generally, biological specimens have high optical transmissions, so that transparent illumination is employed. The biological specimens are observed by using a kind of special optical microscopes, since conventional optical microscopes cannot provide high-contrast optical images due to the high optical transmissions of the specimens. Special optical microscopes include phase-contrast microscopes, modulation-contrast microscopes, and differential interference microscopes. These special microscopes can visualize optically transparent specimens.

FIG. 19 shows an example of a scanning probe microscope that incorporates a special optical microscope. As shown in FIG. 19, the scanning probe microscope comprises an inverted microscopic optical system and a transparent illumination optical system, which constitute a phase-contrast microscope in cooperation with each other.

An illumination optical system 10 is supported by an arm 6, which is attached to the upper end of a supporting column 4 on a base 2. The optical system 10 includes a light source 12, a collector lens 14, a slider 16, and a condenser lens 18. The slider 16, which is movable across an optical path, has a ring slit 16a for phase-contrast microscopy, which selectively transmits a part of illumination light from the light source 12, and a light transmitting section 16b, which transmits the light from the light source 12. If necessary, the slit 16a is situated in the optical path.

A Z-stage 20 is attached to the supporting column 4. The Z-stage 20 includes a stationary section 20a fixed to the column 4 and a moving section 20b movably supported by the stationary section 20a. An arm 22 is fixed to the movable section 20b, and retains the upper end portion of a piezoelectric tube scanner 24. A head 30 is held on the lower end of the scanner 24. A cantilever chip 40 is attached to the underside of the head 30. The chip 40 has a cantilever extending from a supporting portion, and a projection or probe is formed on the underside of the distal end of the cantilever. The head 30 has therein a displacement measurement optical system for measuring the displacement of the cantilever of the cantilever chip 40. This measurement optical system includes a laser diode 32, a focusing lens 34, reflecting means 36, and a photodiode 38 having a plurality of light receiving portions. The displacement of the cantilever of the cantilever chip 40 is obtained on the basis of the position of incidence of reflected laser beam from the cantilever upon the photodiode 38, that is, differences between outputs from the light receiving portions.

A slide glass 50, which carries a biological specimen thereon, is placed on a specimen stage 52 that is fixed to the supporting column 4. An objective lens 58 for phase-contrast microscopy is located under the stage 52 and fixed to a retaining member 54 that is set up on the base 2. Reflecting means 64 is located under the objective lens 58, and a CCD camera 66 for microscopic image observation is provided in the path of reflection of the reflecting means 64.

The working distance of the condenser lens 18 is 182 mm, the piezoelectric tube scanner 24 has an inside diameter of 28 mm and a length of 80 mm, and the head 30 is 20 mm high. Thus, the numerical aperture of the upper end of the scanner 24 is 0.14 $(=14/(14^2+100^2)^{1/2})$. The condenser lens 18 has a numerical aperture of 0.1, and illumination light from the lens 18 cannot be intercepted by the scanner 24. Objective lenses having powers of 4×, 10×, and 20× magnifications are applicable to this illumination.

Since the illumination light for irradiating the specimen is restricted by the top aperture of the piezoelectric tube scanner 24, the numerical aperture of the illumination optical system 10 cannot be larger than 0.14 even though the condenser lens 18 has a large numerical aperture. The optical microscope provides a resolution of 940 nm for an objective lens with a numerical aperture of 0.6 and illumination light with a wavelength of 570 nm.

Applicable objective lenses are allowed to have a power of 20× magnification at the most, and objective lenses of 40× magnification, which are frequently used in phase-contrast microscopy, cannot be employed for the purpose. This is because the objective lenses of 40× magnification have numerical apertures of 0.55 to 0.6 such that the numerical apertures of ring slits corresponding to these lenses are larger than that of the upper end of the piezoelectric tube scanner.

SUMMARY OF THE INVENTION

The object of the present invention is to provide a scanning probe microscope including an optical microscope which ensures observation of optically transparent specimens, such as biological specimens, with a high power of 40× magnification or more.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is an enlarged view of a head shown in FIG. 1 and its surroundings as taken in the direction of arrow A of FIG. 1;

FIG. 3 is a bottom view of the head shown in FIG. 1 and its surroundings, schematically showing the relative positions of an oblique illumination optical system and other elements;

FIG. 4 shows a construction of a modulator shown in FIG. 1;

FIG. 5 shows a scanning probe microscope according to another preferred embodiment of the invention;

FIG. 6 shows a scanning probe microscope according to still another preferred embodiment of the invention;

DETAILED DESCRIPTION OF THE PREFERRED EMBODIMENTS

Figure 1:
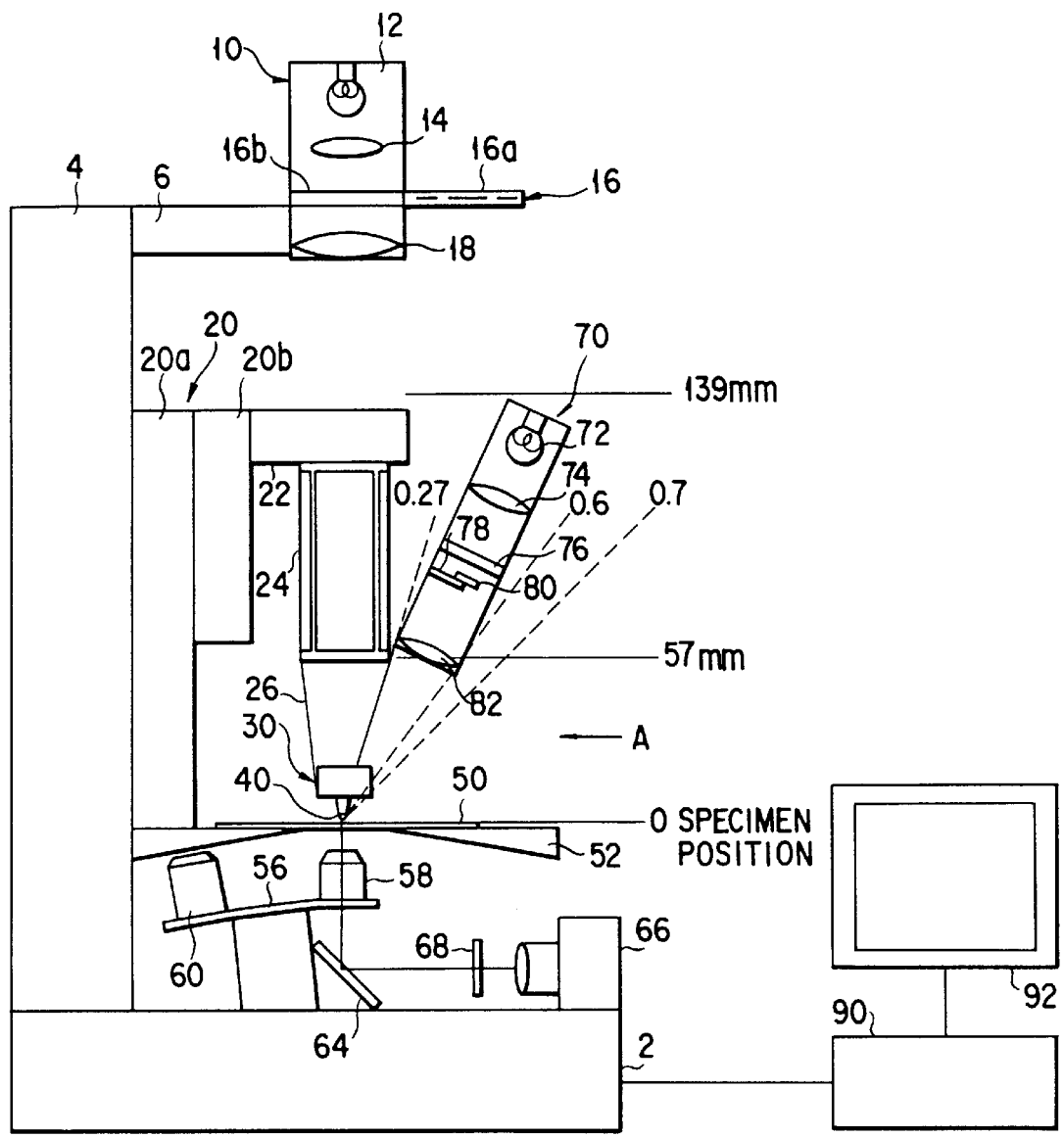
FIG. 1 shows a scanning probe microscope according to a preferred embodiment of the present invention.

FIG. 1 shows a scanning probe microscope according to a preferred embodiment of the present invention. The scanning probe microscope is provided with an inverted optical microscope and two illumination optical systems, whereby a specimen can be observed by low-power phase-contrast microscopy and high-power modulation-contrast microscopy.

Figure 19:
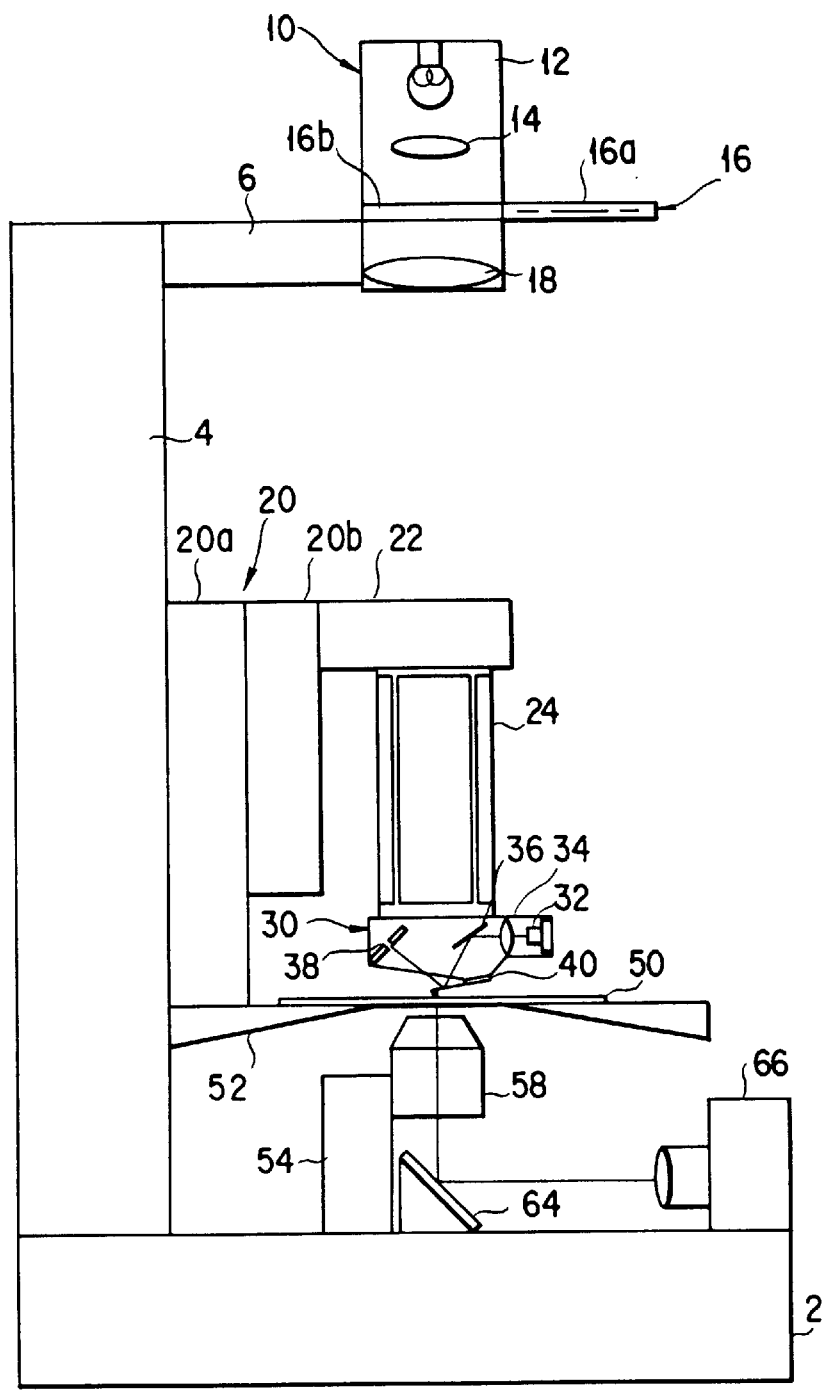
FIG. 19 shows a conventional scanning probe microscope.

As shown in FIG. 1, a Z-stage 20 is attached to a supporting column 4 that is set up on a base 2. The Z-stage 20 includes a stationary section 20a fixed to the column 4 and a movable section 20b movably supported by the stationary section 20a. An arm 22 is fixed to the movable section 20b, and retains the upper end portion of a tube actuator, e.g., a piezoelectric tube scanner 24. A head 30 is fixed to the lower end of the scanner 24 by means of a head supporting member 26. The head 30 is constructed in the same manner as the conventional one shown in FIG. 19 except that it is positioned with a 90° angular directional difference. A cantilever chip 40 is attached to the underside of the head 30.

As shown in FIG. 2, the cantilever chip 40 has a cantilever 44 extending from a supporting portion 42, and a projection or probe 46 is formed on the underside of the distal end of the cantilever 44. The chip 40 is mounted on the head 30 in a manner such that the axis of the probe 46 is in alignment with that of the piezo-electric tube scanner 24, that is, the elements 46 and 24 are coaxial.

The head 30 is provided with displacement measuring unit for measuring the displacement of the free end portion, in particular, of the cantilever 44 of the mounted cantilever chip 40. This measuring unit includes a laser diode 32 for emitting a laser beam for measurement, a focusing lens 34 for focusing the laser beam from the diode 32, a reflecting unit, e.g., a total-reflection mirror 36, for directing the laser beam from the lens 34 toward the cantilever 44, and a photodiode 38 for receiving the reflected laser beam from the cantilever 44. The photodiode 38 includes a plurality of light receiving portions that deliver outputs corresponding to the quantity of incident light. The displacement of the cantilever 44 is computed on the basis of the position of incidence of the reflected laser beam from the cantilever upon the photodiode 38, and more specifically, differences between the outputs from the light receiving portions of the photodiode 38.

Referring to FIG. 1, a specimen stage 52 is attached to the supporting column 4. Provided over the stage 52 is a slide glass 50, which carries, for example, a biological specimen thereon. Alternatively, the stage 52 may be loaded with a laboratory dish that contains a biological specimen cultured therein.

Provided under the specimen stage 52 is a revolver 56 that can retain a plurality of objective lenses. The revolver 56 can selectively locate one of the objective lenses, which are mounted on the revolver 56, under the specimen so that the axis of the lens is in alignment with that of the probe 46. In FIG. 1, a low-power objective lens 58 for phase-contrast microscopy and a high-power objective lens 60 for modulation-contrast microscopy are mounted on the revolver 56, the lens 58 being coaxial with the probe 46.

The objective lens for phase-contrast microscopy includes a phase plate therein, which has a ring-shaped phase film, and the aforesaid ring slit 16a selectively allows the passage of only those light rays that reach the phase film when no specimen is in the path of observation light. Thus, a ring-shaped illumination light beam passed through the slit 16a is incident upon the phase film unless it is diffracted by a specimen. In other words, the phase film and the ring slit are designed so that their respective diameters and widths are associated in this manner.

Reflecting unit 64 is located on the axis of the probe 46 under the position for the location of the objective lens to be actually used for observation. A CCD camera 66 for shooting an image picked up by the objective lens is provided in the path of reflection of the reflecting unit 64. If necessary, a modulator 68 for modulation-contrast microscopy is located in front of the camera 66.

The reflecting unit 64 may be a beam splitter, for example. In this case, a reflector (not shown) is disposed under the beam splitter, and an eyepiece is provided on the path of reflection of the reflector so that a user can observe the specimen by his own eye.

The apparatus further comprises an image processing unit 90 and an image display unit 92. The processing unit 90 forms an image in accordance with a signal from the CCD camera 66, and causes the display unit 92 to display the image. Based on information from the photodiode 38 and a scanning signal from the piezoelectric tube scanner 24, moreover, the processing unit 90 forms a specimen image (SPM image), and causes the display unit 92 to display the SPM image.

An illumination optical system 10 for phase-contrast microscopy overlies the piezoelectric tube scanner 24. The system 10 is supported by an arm 6, which is attached to the upper end of the supporting column 4 on the base 2. The optical system 10 includes a light source 12 for emitting illumination light, a collector lens 14 for picking up the emitted illumination light, a slider 16 movable across an optical path, and a condenser lens 18 for condensing the illumination light. The slider 16 has a light transmitting section 16b, which transmits the illumination light from the light source 12, and the ring slit 16a for phase-contrast microscopy, which selectively transmits a part of the light from the light source 12. If necessary, the slit 16a is situated in the optical path.

The condenser lens 18 is located so that its optical axis or central axis is in line with that of the objective lens 58 or 60 (lens 58 in FIG. 1), which is coaxial with the probe 46. Thus, the condenser lens 18 and the objective lens for observation are arranged coaxial with each other. For this reason, the illumination optical system 10 will be referred to as the coaxial illumination optical system hereinafter.

An illumination optical system 70 for modulation-contrast microscopy is located outside the piezoelectric tube scanner 24. The system 70 includes a light source 72 for emitting illumination light, a collector lens 74 for picking up the emitted illumination light, a polarizing plate 76 supported for rotation, a retractable slit 78, a polarizing plate 80 fixed to the slit 78, and a condenser lens 82. The slit 78 is situated on the front focal plane of the lens 82.

The condenser lens 82 is located so that its optical axis or central axis is inclined with respect to that of the objective lens 58 or 60 (lens 58 in FIG. 1) that is coaxial with the probe 46. For this reason, the illumination optical system 70 will be referred to as the oblique illumination optical system hereinafter.

As shown in FIG. 3, the head supporting member 26 has a structure such that a portion thereof corresponding to an angular range indicated by $\Phi$ is cut lest it intercept illumination light from the oblique illumination optical system 70. FIG. 2 shows an opening 28 that is formed by notching. The head 30 is attached to the supporting member 26 in a direction such that the components of the displacement measuring means never intercept the illumination light.

The condenser lens 18 of the coaxial illumination optical system 10 for phase-contrast microscopy has a numerical aperture of 0.1, and the piezoelectric tube scanner 24 has an inside diameter of 28 mm. Since the height that ensures the numerical aperture of 0.1 for a circle of 14-mm radius is 139 mm (for $14/(14^2+139^2)^{1/2}=0.1$), phase-contrast observation can be effected even when the upper end of the scanner 24 is situated 139 mm above the position of the specimen. If the height for which the probe is moved up or down to shift the position of the specimen is 2 mm, the upper end of the scanner 24 is allowed to reach a position 137 mm above the specimen position. If the length of the scanner 24 is 80 mm, the distance from the lower end of the scanner 24 to the specimen is 57 mm. The numerical aperture of the outer peripheral portion of the scanner 24 is $n\sin\beta=16/59=0.27$.

The method of illumination is changed depending on the numerical aperture (NA) of the objective lens. For the objective lens with NA<0.1, the illumination is performed through the inside of the piezoelectric tube scanner 24 by means of the coaxial illumination optical system 10, while for the objective lens with NA>0.27, the illumination is performed diagonally from outside the scanner 24 by means of the oblique illumination optical system 70. More specifically, observation based on the phase-contrast microscopy using the coaxial illumination optical system 10 is carried out for the objective lens 58 with a low power of about 20× magnification, while observation based on the modulation-contrast microscopy using the oblique illumination optical system 70 is carried out for the objective lens 60 with the higher power. The numerical aperture of the objective lens 60 is 0.6 for 40× magnification and 0.7 for 60× magnification. Broken lines in FIG. 1 indicate angles corresponding to the numerical apertures of 0.27, 0.6, and 0.7, individually.

In carrying out the observation based on the phase-contrast microscopy, the revolver 56 is shifted to locate the low-power phase-contrast objective lens 58 under the specimen, and the modulator 68 is kept off the optical path. The slider 16 is adjusted so that its ring slit 16a is in the optical path. By this illumination using the coaxial illumination optical system 10, an image having a contrast that depends on the variation of the thickness of the specimen is formed and observed by means of the CCD camera 66. The image can be observed by the conventional microscopy using transparent illumination if the slider 16 is adjusted so that its light transmitting section 16b is situated in the optical path.

In carrying out the observation based on the modulation-contrast microscopy, the revolver 56 is shifted to locate the high-power large-aperture objective lens 60 under the specimen, and the modulator 68 is situated on the exit pupil surface of the lens 60. As shown in FIG. 4, the modulator 68 includes a low-transmission black portion 68a, a medium-transmission gray portion 68b, and a high-transmission transparent portion 68c. The gray portion 68b is positioned so as to be conjugate to the opening of the slit 78. By the illumination using the oblique illumination optical system 70, an image having a contrast that depends on the inclination based on the change in the thickness of the specimen is formed and observed by means of the CCD camera 66.

The present embodiment may be modified and the above described techniques may be variously applied. Since the objective lenses 58 and 60 are mounted on the revolver 56, for example, the revolver may be fitted with a switch or some other means for signaling the power of each objective lens so that the illumination optical system (coaxial or oblique) can be automatically changed depending on the lens power.

Dark-field illumination may be realized by using the oblique illumination optical system 70 for observation by means of an objective lens with a small numerical aperture, e.g., an objective lens of 10× magnification (NA=0.25) or 40× magnifications (NA=0.13).

FIG. 5 shows part of a scanning probe microscope according to another preferred embodiment of the invention.

This apparatus comprises a piezoelectric tube scanner 124, and the numerical aperture at the lower end of the scanner is larger than 0.4. A head supporting member 126 is fixed to the lower end of the scanner 124, and a head 30 is attached to the underside of the member 126. Provided over the scanner 124 is an illumination optical system (not shown) for illumination through the inside of the scanner. This optical system is similar to the coaxial optical system 10 according to the foregoing embodiment.

The apparatus further comprises an oblique illumination optical system 170, which is supported by an xyzθ-stage 184 on a specimen stage 152. The xyzθ-stage 184 includes an x-table 188 for x-direction movement on a base 186, a y-table 190 for y-direction movement on the x-table 188, a variable-angle θ-table 192 on the y-table 190, and a z-table 194 for movement in the height direction with respect to the θ-table 192.

The head supporting member 126 is 25 mm long, and has a wide partial notch in which a mirror 198 is housed. Provided under the mirror 198 is a mirror 196 for optically connecting the mirror 198 and the oblique illumination optical system 170. Both the mirrors 196 and 198 are attached to a casing (not shown) of the optical system 170. The optical system 170 corresponds to an angular range between angles for numerical objective lens apertures of 0.27 and 0.6. The x-table 188 has a very long stroke such that the mirrors 198 and 196 can be retreated lest they hinder the installation of a probe.

If the objective lens used has a numerical aperture smaller than 0.27, it is illuminated through the inside of the piezoelectric tube scanner 124. If the objective lens used has a numerical aperture larger than 0.27, it is illuminated diagonally from outside the scanner 124 by means of the oblique illumination optical system 170.

The piezoelectric tube scanner 124 of the apparatus according to the present embodiment is thick enough to improve the vibration-proof properties of the apparatus and restrain deterioration of images attributable to vibration or the like.

FIG. 6 shows a scanning probe microscope according to still another preferred embodiment of the invention. In the description to follow, like reference numerals are used to designate members that are similar to corresponding members according to the first embodiment, and a detail description of those members is omitted.

The apparatus comprises a coaxial illumination optical system 10 and an oblique illumination optical system 210, which are used to effect observations based on low- and high-power phase-contrast microscopies, respectively.

The revolver 56 is fitted with a high-power objective lens 240 for phase-contrast microscopy, besides a low-power objective lens 58 for phase-contrast microscopy. The high-power objective lens has, for example, a power of 40× to 100× magnification and a numerical aperture ranging from 0.7 to 1.3, for example. The objective lens 240 includes a phase plate therein, which has a ring-shaped phase film situated corresponding to numerical apertures between 0.45 and 0.5. FIG. 6 shows broken lines that represent angles corresponding to numerical apertures of 0.45 and 0.5, individually, along with a broken line that represents an angle corresponding to the numerical aperture of 0.27.

The oblique illumination optical system 210 includes a light source 212 for emitting illumination light, a collector lens 214 for picking up the emitted illumination light, a diaphragm 220, and a condenser lens 216. The lens 216 is located so that its optical axis or central axis is inclined with respect to that of the objective lens that is coaxial with a probe 46.

Although the light source 212 shown in FIG. 6 is an electric lamp, it may alternatively be formed of a light guide such as an optical fiber. The use of the light guide enables the scanning probe microscope to be kept away from any heat source such as an electric bulb, thereby reducing influences of heat on the microscope and improving the accuracy of measurement.

The observation based on the low-power phase-contrast microscopy, as described in connection with the first embodiment, is carried out in illumination light from the coaxial illumination optical system 10, with the exclusive-use objective lens 58 for the purpose coaxial with the probe 46 and with a ring slit 16a in the optical path.

The observation based on the high-power phase-contrast microscopy is carried out in illumination light from the oblique illumination optical system 210, with the exclusive-use objective lens 240 for the purpose coaxial with the probe 46.

Figure 7:
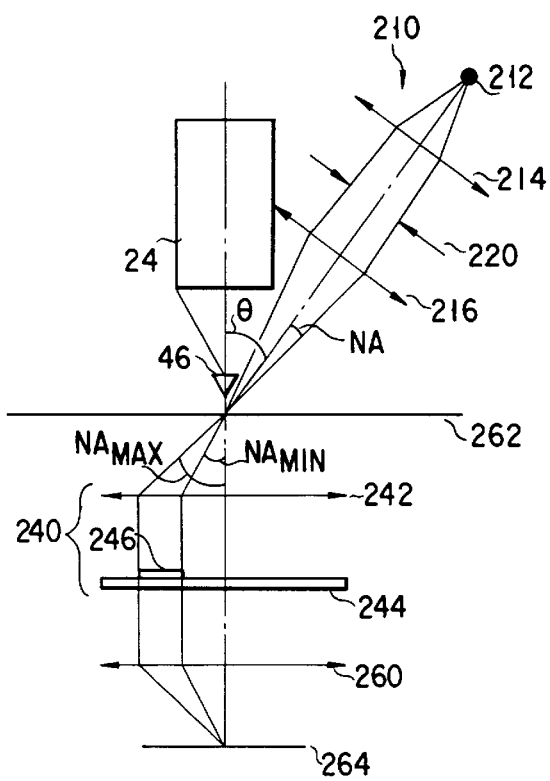
FIG. 7 shows an optical system of the apparatus shown in FIG. 6 being used for observation based on high-power phase-contrast microscopy.
Figure 8:
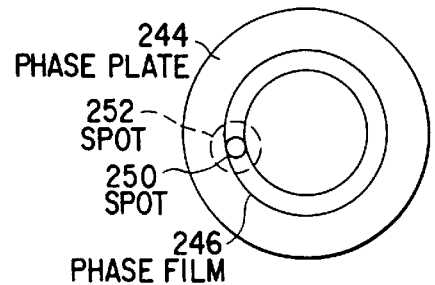
FIG. 8 is a plan view of a phase plate shown in FIG. 7.

FIG. 7 shows the optical system being used for the observation based on the high-power phase-contrast microscopy. The high-power objective lens 240 for phase-contrast microscopy has a lens 242 and a phase plate 244 therein, the plate 244 being situated in the pupil position of the lens 242. As shown in FIG. 8, the phase plate 244 includes a ring-shaped phase film 246, which changes the phase of light transmitted through it by π/2. The phase plate 244 may be positioned so as to be conjugate to the pupil position of the lens 242 that is obtained by adding a relay optical system.

The illumination light from the oblique illumination optical system 210 is projected, preferably entirely, on the phase film 246 in the case where no specimen is on a specimen surface, that is, if there is no diffraction on the specimen surface. In other words, various measured values, e.g., the inside and outside diameters of the ring-shaped film 246 and an angle θ of inclination of the condenser lens 216, are selected so that the illumination light from the optical system 210, which is not influenced by diffraction, are incident, ideally entirely, on the phase film 246.

Figure 9:
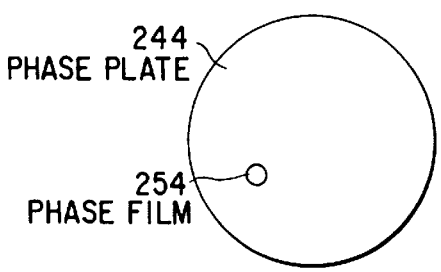
FIG. 9 is a plan view of a phase plate applicable to the optical system of FIG. 7.

The phase film 246 need not always be ring-shaped, and in theory, must only be present in the position of incidence of the illumination light. As shown in FIG. 9, therefore, the phase plate 244 may be provided with a local phase film 254 in a position off the optical axis. With this arrangement, however, the plate 244 requires positioning with respect to the angular direction around the optical axis. The ring-shaped phase film 246 obviates the necessity of this positioning. This indicates that it is ideal to apply the film 246 directly to the apparatus, in consideration of the use of ring-shaped phase films in currently available objective lenses for phase-contrast microscopy.

A numerical aperture $NA_{OB}$ of the objective lens, inclination angle θ of the condenser lens with respect to the optical axis of the objective lens, and numerical aperture $NA_{SB}$ of the lower end of the tube actuator have relations $NA_{OB} > NA_{SB}$, $\theta > NA_{SB}$, and $NA_{OB} > \theta$.

Further, the inclination angle θ of the condenser lens 216 depends on the position of the phase film 246, and preferably, is defined by $NA_{MIN} < \theta < NA_{MAX}$, where $NA_{MIN}$ is a numerical aperture corresponding to that portion of the film 246 which is situated nearest to the optical axis, that is, to the inside diameter of the ring, and $NA_{MAX}$ is a numerical aperture corresponding to that portion of the film 246 which is situated farthest from the optical axis, that is, to the outside diameter of the ring. Further preferably, θ is given by θ=(NA$_{MIN}$+NA$_{MAX}$)/2.

Preferably, the oblique illumination optical system 210 has a small focal depth. A large focal depth inevitably causes images of undesired matter in regions above and under the specimen, such as dust in a culture fluid, to be formed on an image carrying surface 264. It is therefore desirable that there should be no such image of dust or any other untargeted matter which constitutes an obstacle to the observation of the specimen. The focal depth of the optical system 210 can be shortened by using the condenser lens 216 that has a large numerical aperture. Preferably, a numerical aperture NA$_{CL}$ of the lens 216 is given by NA$_{CL}$≧(NA$_{MAX}$−NA$_{MIN}$)/2.

More specifically, as examples, NA$_{MIN}$=0.4, NA$_{MAX}$=0.5, θ=28°, and NA$_{CL}$=0.08.

The condenser lens 216, which has a large numerical aperture, causes a large-diameter spot 252 to be formed on the phase plate 244, as indicated by a broken line in FIG. 8. The large-diameter spot 252 contains many light rays that are off the phase film 246, which is not favorable to phase-contrast microscopy. The diaphragm 220 serves to restrict the illumination light beam, reduce the light rays that are off the phase film 246, and form a small-diameter spot 250 that illuminates the film 246.

Figure 10:
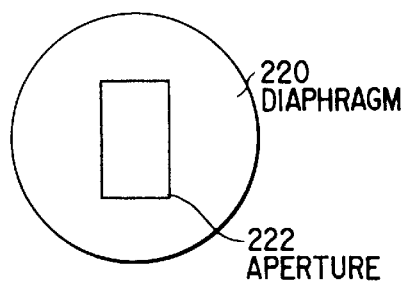
FIG. 10 is a plan view of a diaphragm shown in FIG. 7.
Figure 11:
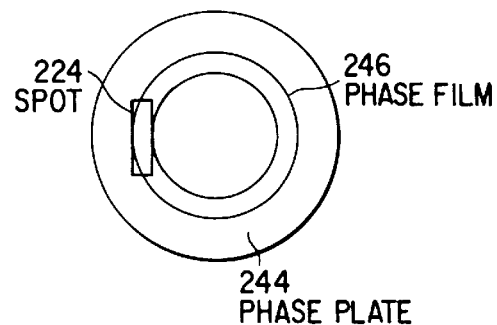
FIG. 11 is a plan view of the phase plate shown in FIG. 8, accompanied with a spot formed by means of an aperture of the diaphragm shown in FIG. 10.

As shown in FIG. 10, the diaphragm 220 preferably has an aperture 222 for transmitting light, which has an oblong shape such as a rectangle with an aspect ratio not equal to 1. As shown in FIG. 11, the rectangular aperture 222 causes a rectangular spot 224 to be formed on the phase plate 244. Although the rectangular spot 224 contains many light rays that illuminate the ring-shaped phase film 246, it also contains a few light rays that are off the film 246. Thus, a great deal of desirable illumination light for observation can be provided.

Preferably, the diaphragm 220 is provided with means for changing the size of the rectangular aperture 222. The diaphragm 220 having the variable-size aperture 222 can be easily obtained by combining plates, e.g., four in number, and a mechanism that movably supports them.

Figure 12:
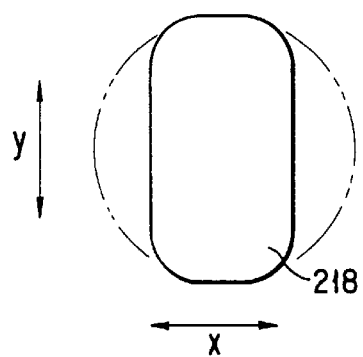
FIG. 12 is a plan view of a condenser lens applicable to an oblique illumination optical system shown in FIG. 7.

The illumination light beam may also be restricted by any other method. For example, it can be restricted with the same result as aforesaid by modifying the circular condenser lens 216 into a condenser lens 218 of a substantially elliptic shape having an aspect ratio not equal to 1, as shown in FIG. 12. The lens 218 may, for example, be manufactured by cutting off both sides of a circular lens. The lens 218 has a numerical aperture of 0.05 for the x-direction in which the cut sides are situated, and a numerical aperture of 0.08 for the y-direction normal to the x-direction. Preferably, the condenser lens 218 is used together with a diaphragm with a variable-size aperture such that the size of the spot formed on the phase plate 244 is adjustable.

Figure 13:
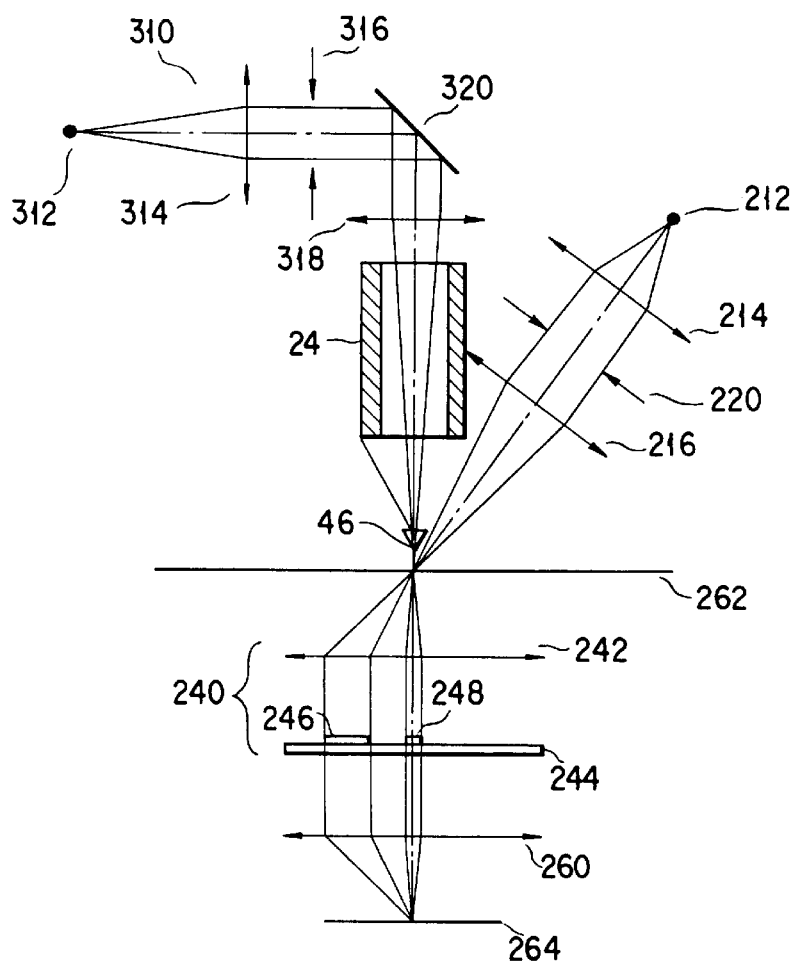
FIG. 13 shows an optical system of a scanning probe microscope according to a further preferred embodiment of the invention being used for observation based on high-power phase-contrast microscopy.

FIG. 13 shows a scanning probe microscope according to a further preferred embodiment of the invention, including an optical system being used for high-power phase-contrast observation. In the description to follow, like reference numerals are used to designate members that are similar to corresponding members according to the foregoing embodiments, and a detail description of those members is omitted.

The apparatus comprises a coaxial illumination optical system 310 for high-power phase-contrast microscopy, as well as an oblique illumination optical system 210. The observation based on the high-power phase-contrast microscopy is carried out in illumination light from both these optical systems 210 and 310. The illumination by the coaxial optical system 310 supplements the illumination by the oblique optical system 210, adds to the quantity of illumination light compared to the case where the oblique system 210 is used solely.

The coaxial illumination optical system 310 includes a light source 312 for emitting illumination light, a collector lens 314 for picking up the emitted illumination light, a diaphragm 316 for restricting illumination light beam, and a condenser lens 318 for condensing the illumination light. The optical system 310 also includes a mirror 320 for bending the optical path, which is used only to restrict the elevation of the apparatus and may be omitted.

Practically, the coaxial illumination optical system 310 can be obtained by attaching the diaphragm 316 to the aforementioned coaxial illumination optical system 10 for low-power phase-contrast microscopy. Thus, the optical system shown in FIG. 13 can be easily realized by using the apparatus shown in FIG. 6.

Figure 14:
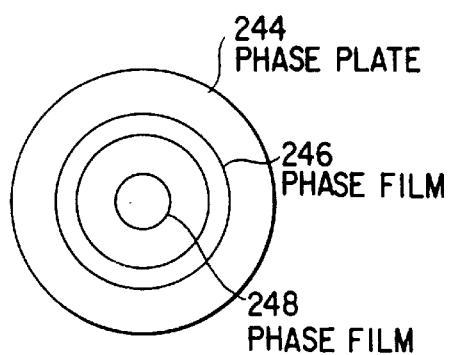
FIG. 14 is a plan view of a phase plate shown in FIG. 13.

As shown in FIG. 14, a phase plate 244 includes a ring-shaped phase film 246 and a circular phase film 248 in its center. The illumination light from the oblique illumination optical system 210 passes through the phase film 246, while the illumination light from the coaxial illumination optical system 310 passes through the phase film 248. Thus, improved observation images can be obtained with an increased quantity of light compared to the case where the oblique system 210 is used solely.

Part of light diffracted by the specimen passes through the circular phase film 248. Since the area of the phase film 248 is narrow, however, the presence of the film 248 entails no substantial lowering of the image contrast.

The arrangement of the ring-shaped phase film 246 and the circular phase film 248 may be realized by combining a phase plate having the ring-shaped film 246 and another phase plate having the circular film 248. The combination of these two phase plates permits the phase plate having the circular film 248 to be alternatively removed from the optical path, thereby improving the observation without the illumination by the coaxial illumination optical system 310.

Figure 15:
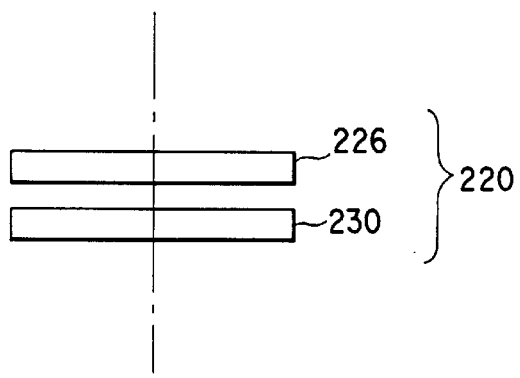
FIG. 15 shows another diaphragm means applicable in place of the ones shown in FIGS. 6, 7 and 13.
Figures 16, 17:
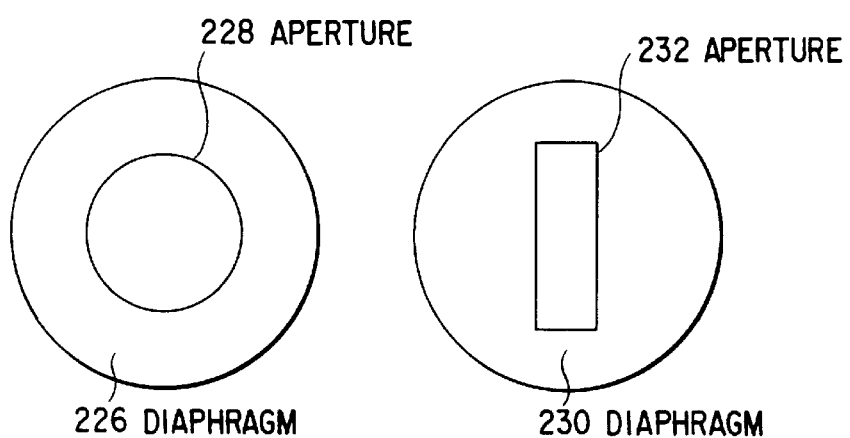
FIG. 16 is a plan view of an upper diaphragm shown in FIG. 15.
FIG. 17 is a plan view of a lower diaphragm shown in FIG. 15.
Figure 18:
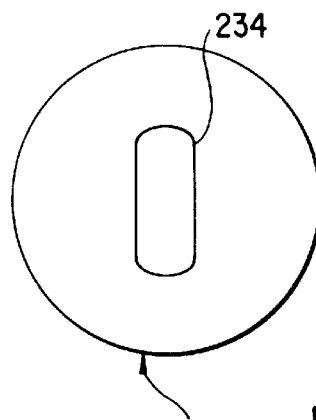
FIG. 18 is a general plan view of the whole diaphragm means shown in FIG. 15.

A diaphragm 220 according to this embodiment may be formed of a plurality of diaphragms, e.g., two diaphragms 226 and 230, as shown in FIG. 15. The diaphragm 226 has a circular aperture 228, as shown in FIG. 16, while the diaphragm 230 has a rectangular aperture 232, as shown in FIG. 17. Substantially, therefore, the diaphragm 220 has an aperture 234 of a shape obtained by cutting off both sides of a circle, as shown in FIG. 18. Preferably, one or both of the diaphragms 226 and 230 have a mechanism for changing the shape of the corresponding one or both of the apertures 228 and 232.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A scanning probe microscope incorporating an optical microscope, comprising:

a cantilever having a probe on a free end thereof;

a displacement measuring unit which measures a displacement of the cantilever caused by an interaction between a specimen and the probe;

a supporting member for supporting the cantilever and the displacement measuring unit;

a tube actuator for supporting the supporting member and controlling a position of the probe in a threedimensional manner, the actuator and the probe being arranged coaxial with each other;

a special microscopic optical system including a pupil modulating element and an objective lens situated on a side opposite to the probe with respect to a surface on which the specimen is placed, the objective lens and the probe being arranged coaxial with each other; and an oblique illumination optical system for illuminating the specimen in a direction oblique to an optical axis of the objective lens, the oblique illumination optical system including a condenser lens having an optical axis inclined with respect to the optical axis of the objective lens, the special microscopic optical system and the oblique illumination optical system constituting, in cooperation with each other, an optical microscope capable of observing optically transparent specimens, wherein $NA_{OB} > NA_{SB}$, $\theta > NA_{SB}$, and $NA_{OB} > \theta$ where $NA_{OB}$ is a numerical aperture of the objective lens, $\theta$ is an angle of inclination of the condenser lens with respect to the optical axis of the objective lens, and $NA_{SB}$ is a numerical aperture of a lower end of the tube actuator.

2. A scanning probe microscope incorporating an optical microscope, comprising:

a cantilever having a probe on a free end thereof;

a displacement measuring unit which measures a displacement of the cantilever caused by an interaction between a specimen and the probe;

a supporting member for supporting the cantilever;

a tube actuator for supporting the supporting member and controlling a position of the probe in a three-dimensional manner;

a special microscopic optical system including a pupil modulating element and an objective lens situated on a side opposite to the probe with respect to a surface on which the specimen is placed; and an oblique illumination optical system for illuminating the specimen in a direction oblique to an optical axis of the objective lens, the oblique illumination optical system including a light source for emitting illumination light which strikes the specimen at an angle inclined with respect to the optical axis of the objective lens, the special microscopic optical system and the oblique illumination optical system constituting, in cooperation with each other, an optical microscope capable of observing optically transparent specimens, wherein $NA_{OB} > NA_{SB}$, $\theta > NA_{SB}$, and $NA_{OB} > \theta$, where $NA_{OB}$ is a numerical aperture of the objective lens, $\theta$ is an angle of inclination of a central ray of the illumination light which strikes the specimen, and $NA_{SB}$ is a numerical aperture of a lower end of the tube actuator.

3. A scanning probe microscope incorporating an optical microscope, comprising:

a cantilever having a probe on a free end thereof;

a displacement measuring unit which measures a displacement of the cantilever caused by an interaction between a specimen and the probe;

a supporting member for supporting the cantilever;

a tube actuator for supporting the supporting member and controlling a position of the probe in a three-dimensional manner;

a special microscopic optical system including a pupil modulating element and an objective lens situated on a side opposite to the probe with respect to a surface on which the specimen is placed; and an oblique illumination optical system for illuminating the specimen in a direction oblique to the optical axis of the objective lens, the oblique illumination optical system including a light source for emitting illumination light and a light guiding system for guiding illumination light to the specimen, the special microscopic optical system and the oblique illumination optical system constituting, in cooperation with each other, an optical microscope capable of observing optically transparent specimens, wherein an angle of inclination $\theta$ of a central ray of the illumination light directed to the specimen with respect to the optical axis of the objective lens is lower than a numerical aperture $NA_{OB}$ of the objective lens, and a minimum value of the angle $\theta$ is lower than a numerical aperture $NA_{SB}$ of a lower end of the tube actuator.

4. A microscope according to claim 3, wherein said light guiding system includes a condenser lens having an optical axis coincident with the central ray of the illumination light directed to the specimen, such that the angle of inclination $\theta$ of the central ray of the illumination light coincides with an angle of inclination of the condenser lens, and wherein $NA_{OB} > NA_{SB}$, $\theta > NA_{SB}$, and $NA_{OB} > \theta$.

5. A microscope according to claim 4, wherein said supporting member is partially notched so as not to intercept illumination light from the oblique illumination optical system.

6. A microscope according to claim 4, wherein said supporting member has a hollow structure, and said microscope further comprises a coaxial illumination optical system for illuminating the specimen along the optical axis of the objective lens through spaces inside the tube actuator and the supporting member, the coaxial illumination optical system including a condenser lens having an optical axis in line with the optical axis of the objective lens.

7. A microscope according to claim 6, wherein said special microscopic optical system includes another objective lens and means for alternatively locating one of the objective lenses in an optical path, whereby one of the oblique illumination and coaxial illumination optical systems illuminates the specimen depending on the one of the objective lenses which is located in the optical path.

8. A microscope according to claim 4, wherein said special microscopic optical system comprises a phase-contrast microscopic optical system.

9. A microscope according to claim 8, wherein said phase-contrast microscopic optical system includes a phase plate located in an optical path and having a phase film for changing a phase of transmitted light, the phase film being situated off the optical axis of the objective lens, and said inclination angle e of the condenser lens being defined by $NA_{MIN} < \theta < NA_{MAX}$, where $NA_{MIN}$ is a numerical aperture corresponding to a portion of the phase film which is situated nearest to the optical axis of the objective lens, and $NA_{MAX}$ is a numerical aperture corresponding to a portion of the phase film which is situated farthest from the optical axis of the objective lens.

10. A microscope according to claim 9, wherein said condenser lens has a numerical aperture $NA_{CL}$ given by $NA_{CL} \geq (NA_{MAX} - NA_{MIN})/2$.

11. A microscope according to claim 10, wherein said oblique illumination optical system includes means for restricting an illumination light beam to reduce illumination light rays off the phase film.

12. A microscope according to claim 11, wherein said phase film is ring-shaped and positioned around the optical axis of the objective lens.

13. A microscope according to claim 12, wherein said light beam restricting means includes a diaphragm for selectively transmitting at least part of the illumination light beam, the diaphragm having an aperture through which light may be transmitted, and the aperture having a shape with an aspect ratio not equal to 1.

14. A microscope according to claim 13, wherein said aperture is rectangular in shape.

15. A microscope according to claim 13, wherein said diaphragm includes means for changing a size of the aperture.

16. A microscope according to claim 12, wherein said light beam restricting means comprises a condenser lens of a shape obtained by cutting off both sides of a circular lens, said condenser lens having an aspect ratio not equal to 1.

17. A microscope according to claim 16, wherein said light beam restricting means further includes a diaphragm for selectively transmitting at least part of the illumination light beam, the diaphragm having an aperture through which light may be transmitted and means for changing a size of the aperture.

18. A microscope according to claim 12, further comprising a coaxial illumination optical system for illuminating the specimen along the optical axis of the objective lens through spaces inside the tube actuator and the supporting member, the coaxial illumination optical system including a condenser lens having an optical axis in line with the optical axis of the objective lens, and wherein said phase plate further includes another phase film for changing the phase of the transmitted light, the second phase film is situated on the optical axis of the objective lens, and illumination light from the coaxial illumination optical system supplements a small quantity of illumination light from the oblique illumination optical system.

19. A microscope according to claim 4, wherein said special microscopic optical system comprises a modulation-contrast microscopic optical system.

20. A microscope according to claim 3, wherein $NA_{OB}>NA_{SB}$, $\theta>NA_{SB}$, and $NA_{OB}>\theta$.

21. A microscope according to claim 20, wherein said supporting member is partially notched so as not to intercept illumination light from the oblique illumination optical system.

22. A microscope according to claim 20, wherein said supporting member has a hollow structure, and said microscope further comprises a coaxial illumination optical system for illuminating the specimen along the optical axis of the objective lens through spaces inside the tube actuator, the coaxial illumination optical system including a condenser lens having an optical axis in line with the optical axis of the objective lens.

23. A microscope according to claim 22, wherein said special microscopic optical system includes another objective lens and means for alternatively locating one of the objective lenses in an optical path, whereby one of the oblique illumination and coaxial illumination optical systems illuminates the specimen depending on the one of the objective lenses which is located in the optical path.

24. A microscope according to claim 20, wherein said special microscopic optical system comprises a phase-contrast microscopic optical system.

25. A microscope according to claim 24, wherein said phase-contrast microscopic optical system includes a phase plate located in an optical path and having a phase film for changing a phase of transmitted light, the phase film being situated off the optical axis of the objective lens, and said inclination angle $\theta$ of the central ray of the illumination light being defined by $NA_{MIN}<\theta<NA_{MAX}$, where $NA_{MIN}$ is a numerical aperture corresponding to a portion of the phase film which is situated nearest to the optical axis of the objective lens, and $NA_{MAX}$ is a numerical aperture corresponding to a portion of the phase film which is situated farthest from the optical axis of the objective lens.

26. A microscope according to claim 25, wherein said oblique illumination optical system includes means for restricting an illumination light beam to reduce illumination light rays off the phase film.

27. A microscope according to claim 26, wherein said phase film is ring-shaped and positioned around the optical axis of the objective lens.

28. A microscope according to claim 27, wherein said light beam restricting means includes a diaphragm for selectively transmitting at least part of the illumination light beam, the diaphragm having an aperture through which light may be transmitted, and the aperture having a shape with an aspect ratio not equal to 1.

29. A microscope according to claim 28, wherein said aperture is rectangular in shape.

30. A microscope according to claim 28, wherein said diaphragm includes means for changing a size of the aperture.

31. A microscope according to claim 27, wherein said light beam restricting means comprises a condenser lens of a shape obtained by cutting off both sides of a circular lens, said condenser lens having an aspect ratio not equal to 1.

32. A microscope according to claim 31, wherein said light beam restricting means further includes a diaphragm for selectively transmitting at least part of the illumination light beam, the diaphragm having an aperture through which light may be transmitted and means for changing a size of the aperture.

33. A microscope according to claim 27, which further comprising a coaxial illumination optical system for illuminating the specimen along the optical axis of the objective lens through spaces inside the tube actuator and the supporting member, the coaxial illumination optical system including a condenser lens having an optical axis in line with the optical axis of the objective lens, and wherein said phase plate further includes another phase film for changing the phase of the transmitted light, the second phase film is situated on the optical axis of the objective lens, and illumination light from the coaxial illumination optical system supplements a small quantity of illumination light from the oblique illumination optical system.

34. A microscope according to claim 20, wherein said special microscopic optical system comprises a modulation-contrast microscopic optical system.

35. A microscope according to claim 20, wherein said light guiding system comprises a condenser lens positioned in an optical path of the illumination light so that a central axis of said condenser lens is coincident with the central ray of the illumination light.

36. A microscope according to claim 3, wherein said light guiding system includes a reflecting mirror positioned between the tube actuator and the specimen, so that reflected light by the reflecting mirror is directed to the specimen.

37. A microscope according to claim 36, wherein said supporting member is partially notched so as not to intercept illumination light from the oblique illumination optical system.

38. A microscope according to claim 36, wherein said supporting member has a hollow structure, and said microscope further comprises a coaxial illumination optical system for illuminating the specimen along the optical axis of the objective lens through spaces inside the tube actuator, the coaxial illumination optical system including a condenser lens having an optical axis in line with the optical axis of the objective lens.

39. A microscope according to claim 38, wherein said special microscopic optical system includes another objective lens and means for alternatively locating one of the objective lenses in an optical path, whereby one of the oblique illumination and coaxial illumination optical systems illuminates the specimen depending on the one of the objective lenses which is located in the optical path.

40. A microscope according to claim 36, wherein said special microscopic optical system comprises a phase-contrast microscopic optical system.

41. A microscope according to claim 36, wherein said light guiding system comprises a condenser lens positioned in an optical path of the illumination light so that a central axis of said condenser lens is coincident with the central ray of the illumination light.

* * * * *

UNITED STATES PATENT AND TRADEMARK OFFICE
CERTIFICATE OF CORRECTION

PATENT NO. : 5,952,562
DATED : September 14, 1999
INVENTOR(S) : Akira Yagi et al.

It is certified that error appears in the above-identified patent and that said Letters Patent is hereby corrected as shown below:

<u>Title page,</u>
Item [45], Date of Patent, before "Sep. 14, 1999" insert -- * --;

Item [73], Assignees, insert
-- [*]   Notice: This patent issued on a
          continued prosecution application filed
          under 37 CFR 1.53(d), and is subject to the
          twenty year patent term provisions of 35
          U.S.C. 154(a) (2). --

Signed and Sealed this

First Day of October, 2002

Attest:

Attesting Officer

JAMES E. ROGAN
Director of the United States Patent and Trademark Office